United States Patent [19]

Goto et al.

[11] Patent Number: 4,912,838

[45] Date of Patent: Apr. 3, 1990

[54] METHOD OF MANUFACTURING ELECTRODE FOR ELECTROMAGNETIC FLOWMETER

[75] Inventors: Tsutomu Goto; Toshihide Inami, both of Tokyo; Masayuki Nemoto, Kanagawa, all of Japan

[73] Assignee: Yamatake-Honeywell Co., Ltd., Tokyo, Japan

[21] Appl. No.: 287,862

[22] Filed: Dec. 21, 1988

[30] Foreign Application Priority Data

| Dec. 25, 1987 | [JP] | Japan | 62-327357 |
| Dec. 25, 1987 | [JP] | Japan | 62-327358 |
| Dec. 25, 1987 | [JP] | Japan | 62-327359 |
| Feb. 8, 1988 | [JP] | Japan | 63-14607[U] |

[51] Int. Cl.⁴ .............................................. H01F 41/02
[52] U.S. Cl. .................................... 29/602.1; 29/854; 73/861.12
[58] Field of Search ...................... 29/602.1, 854–856; 310/11; 73/861.12

[56] References Cited

U.S. PATENT DOCUMENTS

| 4,507,975 | 4/1985 | Bittner et al. | 73/861.12 |
| 4,604,905 | 8/1986 | Rademacher-Dubbick | 73/861.12 |
| 4,741,215 | 5/1988 | Bohn et al. | 73/861.12 |
| 4,782,709 | 11/1988 | Goto et al. | 73/861.12 |

*Primary Examiner*—Carl E. Hall
*Attorney, Agent, or Firm*—Blakely, Sokoloff, Taylor & Zafman

[57] ABSTRACT

A method of manufacturing an electromagnetic flowmeter includes the steps of inserting and filling electrode members into a pair of insertion holes formed to oppose each other from outside to inside through the circumferential wall of a measuring pipe made of a sintered ceramic material, and heating and solidifying the electrode members to form electrodes.

37 Claims, 8 Drawing Sheets

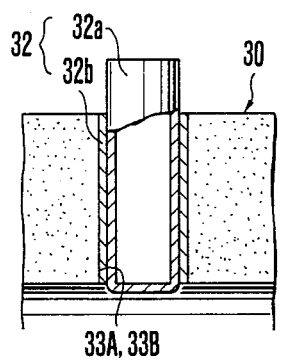
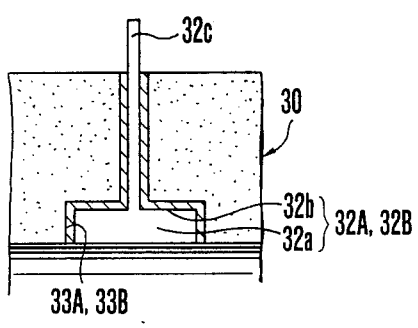
F I G. 7(a)　　　F I G. 7(b)
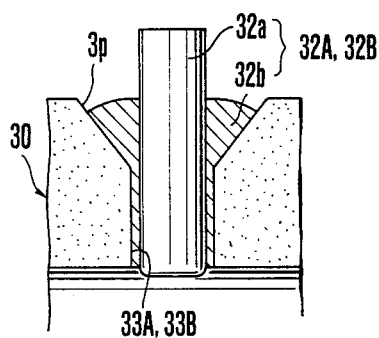
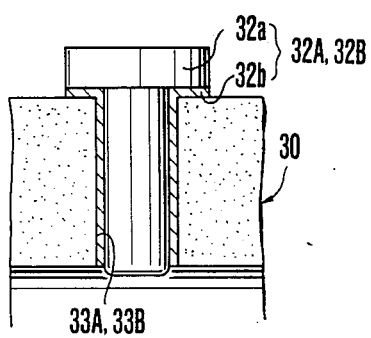
F I G. 7(c)　　　F I G. 7(d)
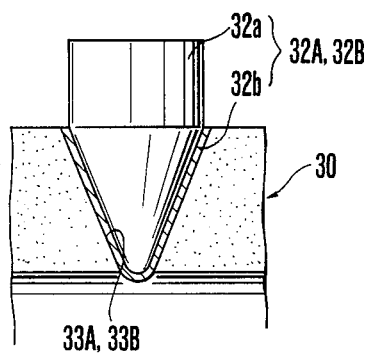
F I G. 7(e)

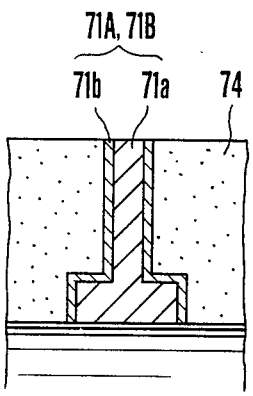
F I G. 15(a)
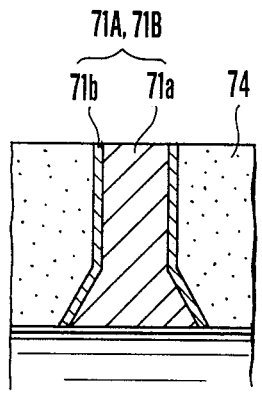
F I G. 15(b)
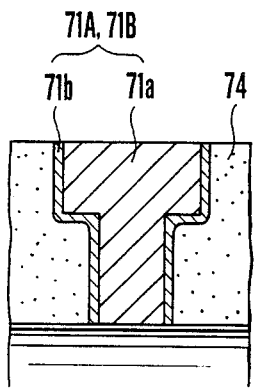
F I G. 15(c)
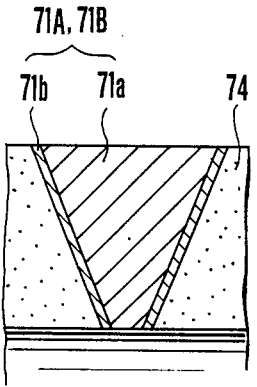
F I G. 15(d)

METHOD OF MANUFACTURING ELECTRODE FOR ELECTROMAGNETIC FLOWMETER

BACKGROUND OF THE INVENTION

The present invention relates to a method of manufacturing an electrode for an electromagnetic flowmeter and, more particularly, to a method of manufacturing an electrode to be used in an electromagnetic flowmeter including a ceramic measuring pipe.

A conventional measuring pipe used in an electromagnetic flowmeter is manufactured by stainless steel or the like and its inner surface is coated with an insulating lining. In recent years, however, a measuring pipe formed by sintering a ceramic material such as alumina ($Al_2O_3$) as a nonconductive material has been developed. Such a measuring pipe has a higher corrosion resistance than that of the conventional metal measuring pipe with a lining and does not deform at a high temperature. In addition, an electrode or the like can be cast in the measuring pipe of this type. Therefore, this measuring pipe having many advantages has been widely used. A variety of structures have been proposed as an electrode structure for an electromagnetic flowmeter using such a ceramic measuring pipe. One example of the structure is disclosed in Japanese patent laid-open No. 58-501552. In this structure, as shown in FIGS. 1a and 1b, a pair of opposed electrode insertion holes 3 are formed in central portions of a circumferential wall of a cylindrical molded body 4 made of a non-sintered ceramic material (e.g., oxide ceramic). Electrodes 1 are inserted in the electrode insertion holes 3 so that their inner ends face the interior of the molded body 4. In this state, the molded body 4 is sintered at about 1,800° C. to obtain a measuring pipe, and at the same time the electrodes 1 are integrally fixed to the electrode insertion holes 3 by sintering. That is, since a ceramic material contracts (by about 17 to 20% in the case of $Al_2O_3$) by sintering, the electrodes 1 and the measuring pipe 4 are integrally formed, and a liquid seal of the electrode insertion holes 3 is obtained. A noble metal such as platinum or a platinum alloy is used as an electrode material. This is because these metals have a satisfactory heat resistance against a sintering temperature of the ceramic material and a thermal expansion coefficient close to that of the ceramic.

Reference numerals 5 denote a pair of excitation coils mounted on the outer surface of the measuring pipe 4.

According to the above method, however, in which the electrodes 1 are inserted in the nonsintered ceramic molded body 4 and integrally fixed to the measuring pipe by sintering, in order to reliably seal the electrode insertion holes 3, a dimensional tolerance between the electrodes 1 and the insertion holes 3 must be strictly set and the circumferential surface of each electrode 1 and the inner surface of each electrode insertion hole 3 must have predetermined surface roughness or higher (i.e., surface undulations must be fine). The electrode insertion holes 3, however, are weak because they are not sintered and therefore are difficult to be subjected to machining for obtaining the necessary surface roughness, resulting in a large number of manufacturing steps and poor yield. In addition, when the electrode 1 is inserted in the nonsintered electrode insertion hole 3, the inner surface of the hole tends to be damaged. Therefore, special care must be taken during assembly. Also, a contraction rate of the ceramic material upon sintering differs in accordance with a lot or a manufacturing time (especially, a season or a weather because of an influence of a temperature or humidity) even if a lot is the same. For this reason, the outer diameter of the electrode 1 and the hole diameter of the electrode insertion hole 3 must be strictly controlled upon each sintering. If the dimensional tolerance is not suitable, fixing of the electrode 1 or the liquid seal becomes defective, or the measuring pipe 4 is cracked or damaged by a stress upon sintering.

SUMMARY OF THE INVENTION

It is, therefore, a principal object of the present invention to provide a method of manufacturing an electrode for an electromagnetic flowmeter, in which fixing of electrodes and a liquid seal of electrode insertion holes are reliable, a measuring pipe is hardly cracked or damaged by a stress upon sintering, and a degree of freedom of selection for an electrode material is increased.

In order to achieve the above object of the present invention, there is provided a method of manufacturing an electromagnetic flowmeter, comprising the steps of inserting and filling electrode members into a pair of insertion holes formed to oppose each other from outside to inside through a circumferential wall of a measuring pipe made of a sintered ceramic material, and heating and solidifying the electrode members to form electrodes.

BRIEF DESCRIPTION OF THE DRAWINGS

FIGS. 7a to 7e are sectional views of still other embodiments of the electrode core;

FIGS. 15a to 15d are sectional views showing still other embodiments of the electrode.

DETAILED DESCRIPTION OF THE PREFERRED EMBODIMENTS

Embodiments of the present invention will be described in detail below with reference to the accompanying drawing.

Figures 1A, 1B:
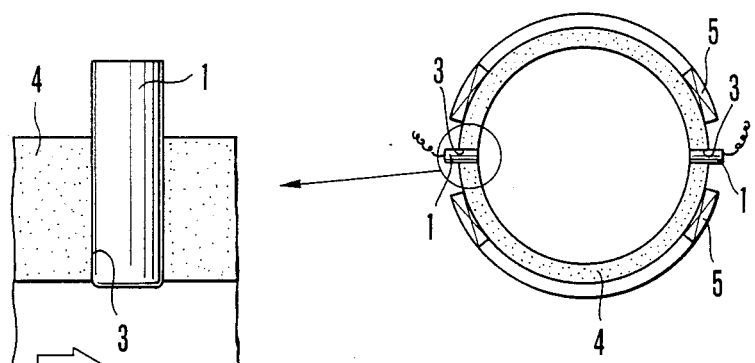
FIGS. 1a and 1b are a sectional view and an enlarged sectional view, respectively, of a main part of a measuring pipe showing a conventional electrode structure.
Figure 2:
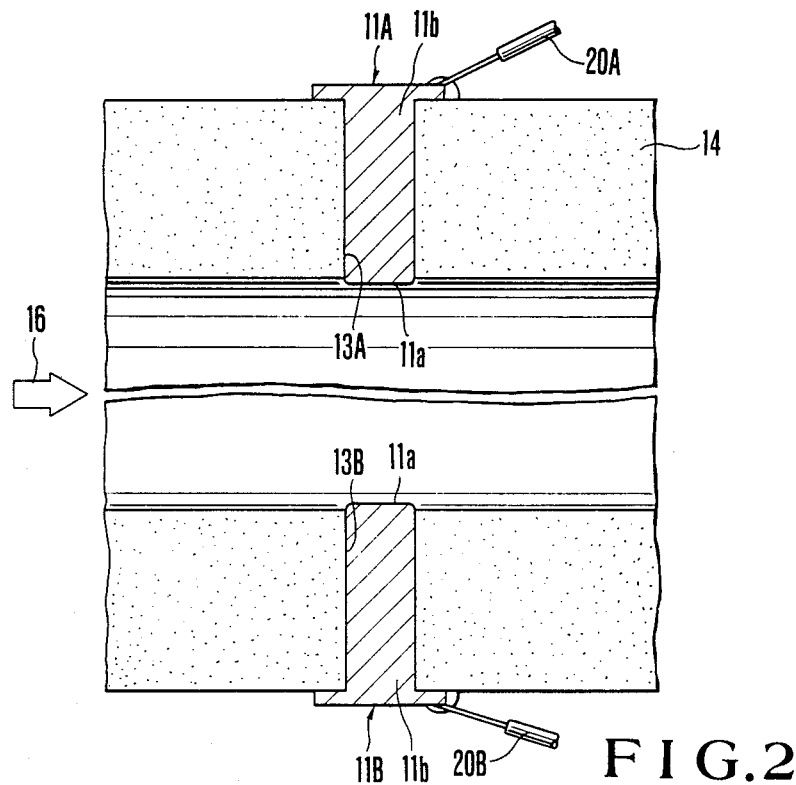
FIG. 2 is a sectional view of a main part of a measuring pipe showing a method of manufacturing an electrode for an electromagnetic flowmeter according to an embodiment of the present invention.

FIG. 2 is a sectional view of an electrode manufactured by an electrode manufacturing method according to an embodiment of the present invention. Referring to FIG. 2, reference numeral 14 denotes a measuring pipe formed of a ceramic material such as $Al_2O_3$ or $ZrO_2$. A pair of excitation coils (see FIG. 1b) are arranged on the outer surface of the measuring pipe 14 to vertically sandwich the measuring pipe 14 and generates a magnetic field in a direction perpendicular to a flowing direction of a conductive fluid to be measured 16 flowing through the measuring pipe 14. A pair of electrode insertion holes 13A and 13B are formed in the central portions of the circumferential wall of the measuring pipe 14 to oppose each other in a direction perpendicular to both the flowing direction of the fluid to be measured 16 and a direction of the magnetic field generated by the excitation coils. Electrodes 11A and 11B are embedded in the electrode insertion holes 13A and 13B, respectively. Since the electrodes 11A and 11B have the same arrangement, only the electrode 11A will be described below. The electrode 11A is formed by metallizing various pastes consisting of conductive materials in accordance with the type of fluid. If corrosion resistance as an electrode is required, a metal powder paste consisting of platinum, gold or the like is used. If the corrosion resistance is not required, an Mo-Mn-based paste, a W-based paste, an Ag-Pd-based paste, an Ag-Pt-based paste, an Ag paste or the like for electronic parts is used. An inner end face 11a of the electrode 11A faces the interior of the measuring pipe 14 to form a liquid contact surface, and its outer end face 11b is soldered to one end of a signal lead wire 20A.

A method of manufacturing the above electrode structure will be described below. First, a cylindrical molded body is formed by a ceramic material such as $Al_2O_3$. The molded body which becomes the measuring pipe 14 by sintering can be easily formed by impressing or isotactic pressing a powdery nonsintered ceramic material by a conventional method. At this time, the electrode insertion holes 13A and 13B are formed in consideration of contraction to occur in the following sintering step. The electrode insertion holes 13A and 13B, however, may be formed by grinding after sintering. The molded body formed as described above is sintered at a predetermined temperature (of about 1,800° C. in the case of $Al_2O_3$) to obtain the measuring pipe 14.

When the sintering step of the measuring pipe 14 is completed, the electrode insertion holes 13A and 13B are subjected to machining to obtain desired hole diameter and surface roughness. A paste is filled in the electrode insertion holes 13A and 13B of the measuring pipe 14. In this state, the measuring pipe 14 is heated at a predetermined temperature for a predetermined time (at about 1,000° to 1,200° C. for 10 to 30 minutes if the paste is a platinum paste). As a result, the paste is sintered in the electrode insertion holes 13A and 13B to form the electrodes 11A and 11B, respectively. At this time, organic components in the paste are evaporated or burned. If the processing of one cycle is unsatisfactory (e.g., a recess portion is produced by thermal contraction), a paste of the same type may be filled and metallized again.

After formation of the electrodes 11A and 11B, one end of the signal lead wire 20A (20B) is connected to the outer end of the electrode 11A (11B), and the excitation coils are mounted on the outer surface of the measuring pipe 14 as shown in FIG. 1, thereby completing the measuring pipe 14.

Figures 3A, 3B, 3C:
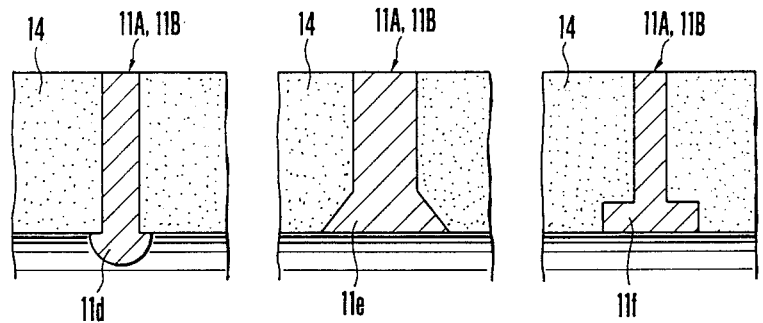
FIGS. 3a, 3b and 3c are sectional views of other embodiments of the electrode, respectively.

FIGS. 3a to 3c show modifications of the electrode 11A (11B) for increasing the liquid contact surface. Referring to FIG. 3a, a semispherical projecting portion 11d as an inner end projects into the measuring pipe 14. In FIG. 3b, the inner end portion is formed to be a conical portion 11e widened toward the interior of the measuring pipe 14. In FIG. 3c, the inner end is formed to be a disk-like portion 11f. In this manner, various modifications may be made as for the shape of the electrode.

According to the above method of manufacturing an electrode structure, after the ceramic measuring pipe 14 is sintered, the paste is filled and metallized in the electrode insertion holes 13A and 13B to form the electrodes. Therefore, postprocessing of the electrode insertion holes 13A and 13B can be performed, or if necessary, the electrode insertion holes 13A and 13B can be formed after the measuring pipe 14 is sintered. As a result, desired hole diameter and surface roughness can be obtained to solve the problem of variations caused by a lot difference or manufacturing time difference. In addition, since the electrodes 11A and 11B are sintered after sintering of the measuring pipe 14, they can be sintered for any number of times if necessary. Therefore, a liquid seal of the electrode insertion holes 13A and 13B can be reliably obtained to prevent a leakage of the fluid to be measured 16. Since the sintering temperature of the electrodes 11A and 11B is determined in accordance with only the material of the paste to be used, the sintering temperature of the measuring pipe 14 need not be taken into consideration. Therefore, since a degree of freedom of selection for an electrode material is increased, more inexpensive materials can be used. In addition, as compared with the conventional manufacturing method in which the nonsintered measuring pipe and the electrodes 11A and 11B are integrally sintered upon sintering of the electrodes, almost no contraction of the measuring pipe 14 occurs, and only a small stress is produced by a contraction of the paste. Therefore, cracks or damages of the measuring pipe 14 can be reduced or prevented. Also, the electrodes sintered integrally with the measuring pipe cannot be replaced even if they require replacement due to, e.g., abrasion. According to the method of the present invention, however, since the electrodes 11A and 11B can be reproduced by adding and sintering the paste, the measuring pipe itself need not be replaced.

According to the method of manufacturing an electrode for an electromagnetic flowmeter, the ceramic measuring pipe is sintered, and then the paste is filled and metallized in the electrode insertion holes of the measuring pipe to form the electrodes. Therefore, a degree of freedom of selection for the type of a material of the electrode is increased. In addition, since the measuring pipe alone is sintered, a stress produced at the electrode mounting portion upon sintering and therefore a stress produced upon electrode sintering can be reduced, thereby preventing cracks or damages of the measuring pipe. Also, even if a dimensional variation occurs due to a lot difference or a manufacturing time difference, postprocessing can be performed to obtain desired dimensional precision and surface roughness of the electrode insertion holes, thereby improving the manufacturing yield. Furthermore, since sintering of the electrodes can be performed for any number of times if necessary, a reliable liquid seal can be obtained. As a result, a high-performance electrode structure can be easily manufactured at low cost.

Figure 4:
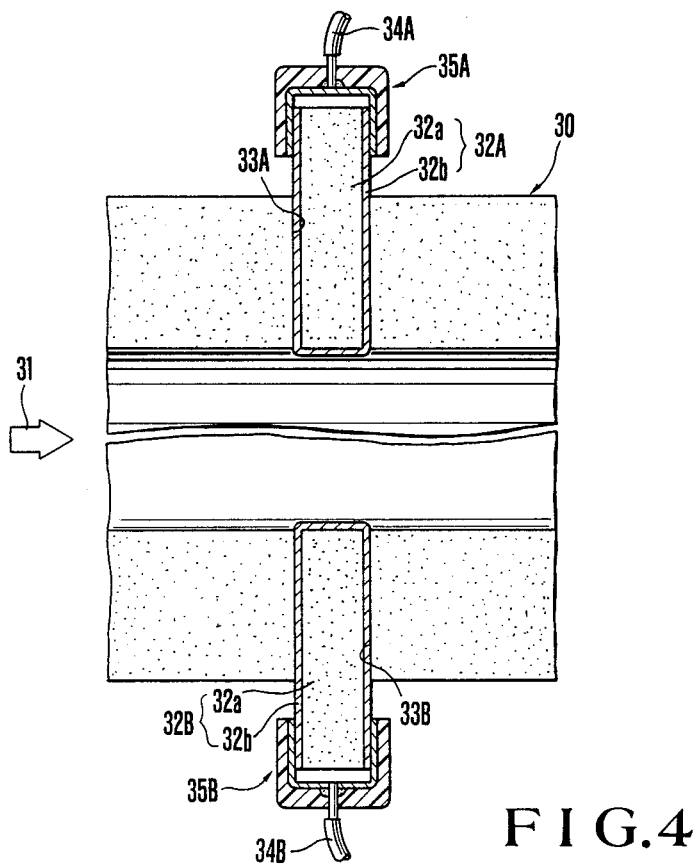
FIG. 4 is a sectional view of a main part of a measuring pipe showing another embodiment of the present invention.

FIG. 4 shows another embodiment of the present invention. Referring to FIG. 4, reference numeral 30 denotes a ceramics measuring pipe made of, e.g., $Al_2O_3$ or $ZrO_2$. A pair of excitation coils (see FIG. 1a) are mounted on the outer surface of the measuring pipe 30 to vertically sandwich the measuring pipe 30 and generate a magnetic field in a direction perpendicular to a flowing direction of a conductive fluid to be measured 31. A pair of electrodes 32A and 32B are inserted in the central portions of the circumferential wall of the measuring pipe 30 to oppose each other in a direction perpendicular to both the flowing direction of the fluid to be measured 31 and the direction of the magnetic field generated by the excitation coils, thereby extracting an electromotive force generated in the fluid to be measured 31.

Since the electrodes 32A and 32B have the same arrangement, only the electrode 32A will be described below. The electrode 32A consists of a rod-like electrode core 32a made of a ceramic material such as $Al_2O_3$ or $ZrO_2$ similar to the measuring pipe 30 and inserted in the electrode insertion hole 33A, and a metal layer 32b, formed on the circumferential surface and the inner end face of the electrode core 32a by sintering, for sealing the electrode insertion hole 33A. The inner end face of the electrode core 32a faces the interior of the measuring pipe 30 to form a liquid contact surface, and its outer end is connected to one end of a signal lead wire 34A through a cap 35A.

A method of manufacturing the electrode structure as described above will be described below. First, the nonsintered measuring pipe, i.e., the molded body is formed by a ceramic material such as $Al_2O_3$. This molded body can be easily formed by compressing a powdery nonsintered ceramic material using an impressing press or an isotactic press by a conventional method. At this time, the electrode insertion holes 33A and 33B are formed in consideration of contraction to occur in the following sintering step. The electrode insertion holes 33A and 33B, however, may be formed by grinding after sintering. The molded body formed as described above is sintered at a sintering temperature of about 1,800° C. to form the measuring pipe 30.

After the sintering step of the measuring pipe 30 is completed, a nonsintered electrode core is formed by a ceramic material such as $Al_2O_3$ in the same manner as the measuring pipe and is sintered at a sintering temperature of about 1,800° C. to form the electrode core 32a. After sintering, the measuring pipe 30 and the electrode core 32a are ground, if necessary, to obtain desired size and surface roughness. A metal powder paste is then coated on the inner surface of the electrode insertion hole 33A (33B) of the measuring pipe 30 and the surface of the electrode core 32a.

If the fluid to be measured 31 is acidic or alkaline and therefore the electrodes 32A and 32B must have a corrosion resistance, a metal powder paste consisting of platinum, gold or the like is used. If no corrosion resistance is required, an Mo-Mn-based paste, a W-based paste, an Ag-Pd-based paste, an Ag-Pt-based paste, an Ag paste or the like for electronic parts is used. The electrode core 32a coated with the platinum paste is inserted in the electrode insertion hole 33A (33B) of the sintered ceramic measuring pipe 30. In this state, the measuring pipe 30 is heated (metallized) again at about 1,100° C. for a predetermined time period. The paste becomes a thin metal layer 32 b because its organic components are evaporated or burned. By this metal layer 32b, the electrode core 32a is sintered in the electrode insertion hole 33A (33B), and the insertion hole 33A (33B) is sealed.

Thereafter, caps 35A and 35B consisting of a metal or a metal and an insulating material are mounted on the outer ends of the electrodes 32A and 32B, and the excitation coils are mounted on the outer surface of the measuring pipe 30, thereby completing the measuring pipe 30.

According to the above electrode manufacturing method, the measuring pipe 30 and the electrode core 32a are sintered independently of each other, the paste is coated on the electrode core 32a and the electrode insertion hole 33A (33B), and then the core 32a is inserted and fixed in the electrode insertion hole 33A (33B) by sintering. Therefore, the measuring pipe 30 and the electrode core 32a can be subjected to machining after sintering like ordinary metals. In particular, the electrode insertion holes 33A and 33B can have dimensional precision and surface roughness obtained in ordinary metal fabrication, thereby solving a problem of variation caused by a lot difference or a manufacturing time difference. In addition, the inner surfaces of the electrode insertion holes 33A and 33B are not damaged when the electrode core 32a is inserted therein. Therefore, since sintering/fixing of the electrode core 32a and sealing of the electrode insertion hole 33A (33B) can be reliably performed by the metal layer 32b, a leakage of the fluid to be measured 31 can be prevented. Also, since sintering is performed beforehand, a contraction amount upon sintering of the electrode core 32a is small, and only a small stress is produced at the electrodes as compared with the conventional manufacturing method in which the measuring pipe and the electrodes are integrally sintered. Therefore, cracks or damages of the measuring pipe 30 can be reduced or prevented. Furthermore, the electrodes sintered integrally with the measuring pipe cannot be replaced even if they require replacement due to, e.g., abrasion. In the method of the present invention, however, by heating and melting the metal layer 32b, the electrode core 32a can be replaced to effectively utilize the measuring pipe 30.

Figure 5A:
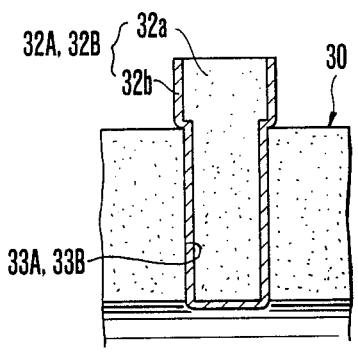
FIGS. 5a, 5b, 5c and 5d are sectional views showing other embodiments of an electrode core, respectively.
Figure 5B:
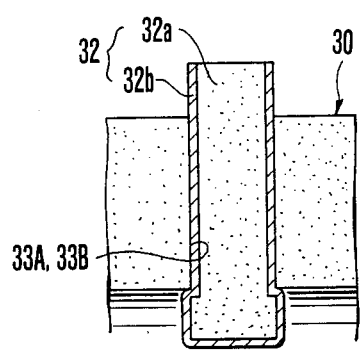
Figure 5C:
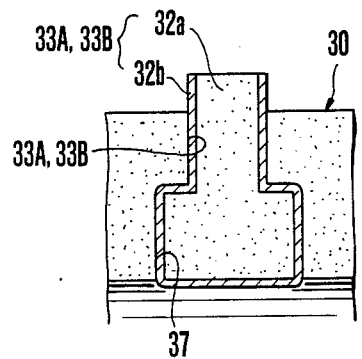
Figure 5D:
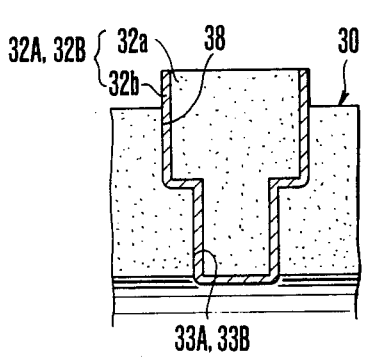

FIGS. 5a to 5d show modifications in which the outer diameter is partially changed to position the electrode core 32a. In FIGS. 5a and 5d, the diameter of the outer end portion is increased to form an external insertion core. In FIGS. 5b and 5c, the diameter of the inner end portion is increased to form an internal insertion core. In FIGS. 5a and 5b, the diameter of the electrode insertion hole 33A (33B) is uniform throughout the overall length. In FIGS. 5c and 5d, seats 37 and 38 are formed at the inner and outer opening end portions of the electrode insertion hole 33A (33B), respectively, so that the large-diameter portion of the electrode core 32a is fitted in the seat 37 or 38. The internal insertion electrode core 32a shown in FIG. 5b or 5c has a large liquid contact surface and therefore is advantageous in measuring a low-conductivity fluid to be measured.

Figure 6:
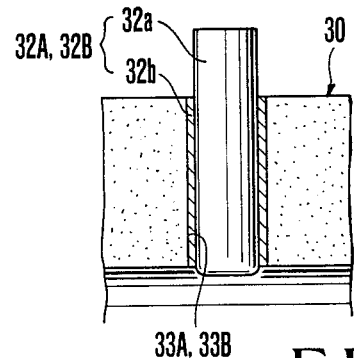
FIG. 6 is a sectional view of a main part of a measuring pipe showing still another embodiment of the present invention.

FIG. 6 shows an electrode core 32a made of platinum (or a platinum alloy) and sintered/fixed by a platinum powder paste (or a platinum alloy powder paste). In this case, since the electrode core 32a is originally made of a conductive material, the platinum powder paste (or the platinum alloy powder paste) need only be coated on the circumferential surface but need not be coated on the liquid contact surface. In addition, as in the embodiment shown in FIG. 4, the sintering step of the electrode core 32a is performed after the ceramic measuring pipe 30 is sintered. If the corrosion resistance is required, the platinum paste (or the platinum alloy powder paste) preferably has a larger content of Pt (weight ratio of 85% or more). If the corrosion resistance is not required, the content of Pt may be smaller.

FIGS. 7a to 7e show a metal electrode core 32a having different shapes. In FIG. 7a, the electrode core 32a is a cylindrical member with a bottom, the outer end of which is opened. In FIG. 7b, the electrode core 32a is formed to be a disk-like member to increase the liquid contact surface and to receive a fluid pressure, and a rod-like conductive portion 32c formed integrally with the electrode core 32a projects externally from the outer surface of the measuring pipe 30. In FIG. 7c, a tapered hole 39 is formed in an outer opening end portion of an electrode insertion hole 33A (33B) to obtain a pressure resistance, and the tapered hole 39 is covered with a metal layer 32b. In this case, the metal at the tapered portion is filled after the metal member is inserted in the insertion hole. In FIG. 7d, the diameter of the outer end of the electrode core 32a is increased larger than that of the insertion hole to position the electrode core 32a, as in FIG. 5a. In FIG. 7e, the electrode insertion hole 33A (33B) is tapered, and an insertion end portion of the electrode core 32a is formed to be a conical. In addition to the above modifications, various other modifications may be made as the shape of the electrode core 32a.

According to the method of manufacturing an electrode for an electromagnetic flowmeter of the present invention as described above, the cylindrical molded body is formed by a nonsintered ceramic material and sintered to form the ceramic measuring pipe. Thereafter, the paste is coated in the electrode insertion holes formed in the circumferential surface of the measuring pipe and on the circumferential surfaces of the electrode cores. The electrode cores are inserted in the electrode insertion holes and sintered/fixed therein by metallizing the paste. Therefore, fixing of the electrodes and sealing of the electrode insertion holes can be reliably performed to prevent a leakage of the fluid to be measured. In addition, since the electrodes are sintered after sintering of the measuring pipe, a degree of freedom of selection for an electrode material is increased. Also, since the measuring pipe alone is sintered, a stress produced at the electrodes upon sintering and therefore a stress produced upon electrode sintering can be reduced to prevent cracks or damages of the measuring pipe. Furthermore, when a dimensional variation occurs due to a lot difference or a manufacturing time difference, a postprocessing can be performed. Therefore, the electrode insertion hole having desired dimensional precision and surface roughness can be formed, thereby improving the manufacturing yield. As a result, a high-performance electrode can be easily manufactured at low cost.

Figure 8:
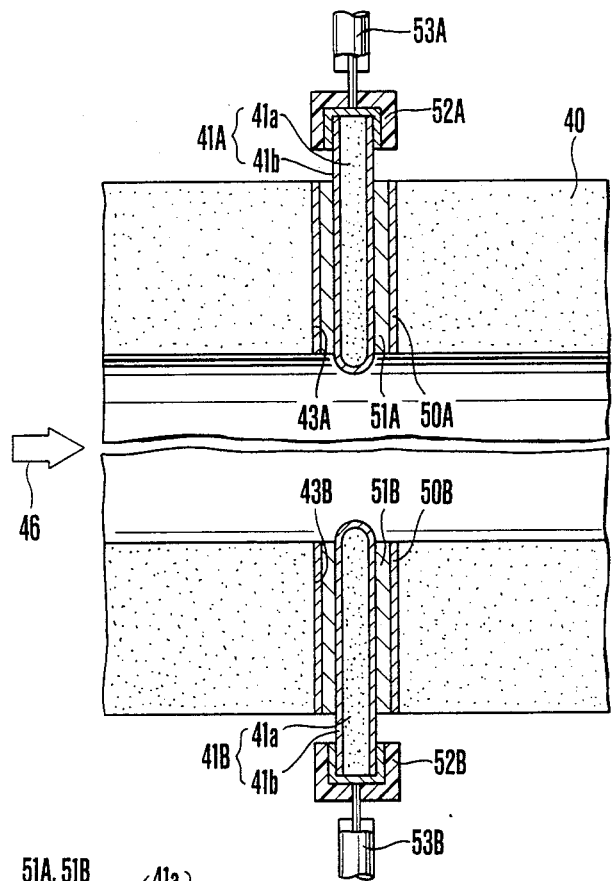
FIG. 8 is a sectional view of a main part of a measuring pipe showing still another embodiment of the present invention.

FIG. 8 shows still another embodiment of the present invention. Referring to FIG. 8, reference numerals 50A and 50B denote metal layers formed by metallizing a paste as a conductive material sintered on the inner surfaces of electrode insertion holes 43A and 43B of a measuring pipe 40, respectively; 51A and 51B, brazing members for connecting electrodes 41A and 41B to the metal layers 50A and 50B, respectively; and 52A and 52B, caps connected to ends of signal lead wires 53A and 53B and mounted on the outer ends of the electrodes 41A and 41B, respectively.

Since the electrodes 41A and 41B have the same arrangement, only the electrode 41A will be described below. The electrode 41A consists of an electrode main body 41a formed by sintering a ceramic material such as $Al_2O_3$ similar to the measuring pipe 40, and a metal layer 41b formed by sintering a paste consisting of a conductive material sintered on the circumferential surface and the inner end face of the electrode main body 41a. The conductive material forming the metal layer 41b is selected in accordance with the type of fluid to be measured. That is, if the electrode 41A must have a corrosion resistance, a metal powder paste consisting of platinum, gold or the like is used. If no corrosion resistance is required, an Mo-Mn-based paste, a W-based paste, an Ag-Pd-based paste, an Ag-Pt-based paste, an Ag paste or the like for electronic parts is used. The metal layer 41b is sintered integrally with the electrode main body 41a. Alternatively, after the electrode main body 41a is sintered, a desired paste is coated on the electrode main body 41a, and the electrode main body 41a is heated and sintered to form the metal layer 41b.

If the metal layers 50A and 50B formed on the inner surfaces of the electrode insertion holes 43A and 43B, respectively, must have the corrosion resistance similar to the metal layer 41b of the electrode 41A (41B), a metal powder paste consisting of platinum, gold or the like is coated and sintered. Otherwise, the Mo-Mn-based paste, the W-based paste or the like is coated and sintered.

Examples of the brazing members 51A and 51B are conductive materials such as a silver brazing alloy, solder and gold silicon having lower melting points (500° to 600° C.) than that of the paste.

A method of manufacturing the above electrode structure will be described below. First, a cylindrical molded body is formed by a nonsintered ceramic material such as $Al_2O_3$. This molded body which is sintered to serve as a measuring pipe can be easily formed by impressing or isotactic pressing a powdery nonsintered ceramic material by a conventional method. A this time, the electrode insertion holes 43A and 43B are formed in consideration of contraction to occur in the following sintering step. The electrode insertion holes 43A and 43B, however, may be formed by grinding after sintering. The molded body formed as described above is sintered at a predetermined temperature (of about 1,800° C. in the case of $Al_2O_3$) to obtain the measuring pipe 40. After sintering of the measuring pipe 40 is completed, the electrode insertion holes 43A and 43B are subjected to machining if necessary to obtain desired diameter and surface roughness.

The metal powder paste is coated on the inner surfaces of the electrode insertion holes 43A and 43B, and the measuring pipe 40 is heated at a predetermined temperature for a predetermined time interval (at 1,000 to 1,200° C. for 10 to 30 minutes if the metal powder paste is a platinum paste). As a result, the metal powder paste is sintered in the electrode insertion holes 43A and 43B to form thin metal layers 50A and 50B, respectively. At this time, organic components contained in the metal powder paste are evaporated or burned.

Then, the electrodes 41A and 41B are inserted in the electrode insertion holes 43A and 43B, respectively, so that their inner end faces face the interior of the measuring pipe 40. The electrode 41A (41B) is prepared beforehand and therefore has the sintered electrode main body 41a and metal layer 41b. When the electrode 41A (41B) is inserted in the electrode insertion hole 43A (43B), the melted brazing member 51A (51B) is flowed into the hole 43A (43B) and is cooled and solidified therein, thereby filling a gap between the metal layers 41b and 50A (50B). As a result, the brazing member 51A (51B) tightly fixes the electrode 41A (41B) in the electrode insertion hole 43A (43B) and seals the electrode insertion hole 43A (43B). In this case, brazing is performed at a temperature of 250° to 600° C.

Thereafter, the caps 52A and 52B are mounted on the outer ends of the electrodes 41A and 41B, respectively, and a pair of excitation coils are mounted on the outer surface of the measuring pipe 40, thereby completing the measuring pipe 40.

According to the method of manufacturing an electrode structure as described above, after the ceramic measuring pipe is sintered, the electrode 41A (41B) is inserted and brazed in the electrode insertion hole 43A (43B). Therefore, the electrode insertion holes 43A and 43B can be subjected to machining after sintering to obtain desired diameter and surface roughness, thereby solving a problem of variations or the like due to a lot difference or manufacturing time difference. In addition, sintering of the metal layers 50A and 50B can be performed for any number of times if necessary because it is performed after the measuring pipe 40 is sintered. Also, since the brazing member 51A (51B) is filled and fixed in the electrode insertion hole 43A (43B) to close the electrode insertion hole 43A (43B) after the sintering step, a reliable liquid seal is obtained, thereby preventing a leakage of a fluid to be measured 46 from the electrode insertion holes 43A and 43B.

Since the sintering temperature of the metal layers 50A and 50B is determined in accordance with only the composition of the material, i.e., the paste, the sintering temperature of the measuring pipe 40 need not be taken into consideration. Therefore, since a degree of freedom of selection for a material is increased, the metal layers 50A and 50B can be formed by less expensive materials. In addition, upon sintering of the metal layers 50A and 50B and brazing of the electrodes 43A and 43B, almost no contraction occurs because the measuring pipe 40 is already sintered. Therefore, as compared with the conventional manufacturing method in which the measuring pipe and the electrodes are integrally sintered, only a small stress is produced to reduce or prevent cracks or damages of the measuring pipe 40. Also, the electrodes sintered integrally with the measuring pipe cannot be replaced even if they require replacement due to abrasion or the like. According to the method of the present invention, however, the electrodes 41A and 41B can be replaced by melting the brazing members 51A and 51B, respectively. Therefore, the measuring pipe 40 can be utilized many times.

Figure 9:
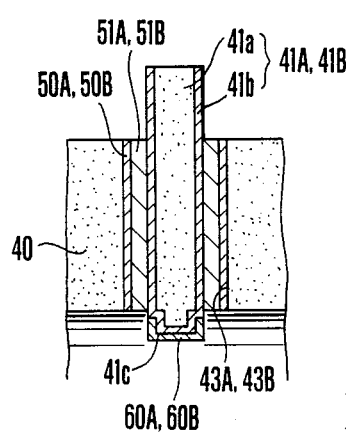
FIGS. 9 and 10 are a sectional view and a sectional view of a main part, respectively, showing still other embodiments of the electrode.
Figure 10:
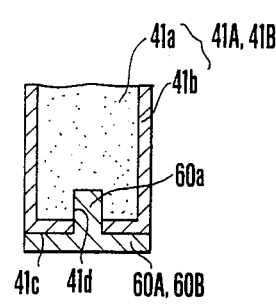

FIG. 9 shows still another embodiment of the electrode according to the present invention. Referring to FIG. 9, a metal cap 60A (60B) is mounted on the inner end face of an electrode 41A (41B), i.e., a liquid contact surface 41c, thereby protecting the liquid contact surface 41c against abrasion, corrosion or the like. The metal caps 60A and 60B are mounted when the electrodes 41A and 41B are manufactured. In this case, as shown in FIG. 10, a fitting projection 60a may be integrally formed on the metal cap 60A (60B) and fitted in a recess portion 41d formed in the liquid contact surface 41c of an electrode main body 41a.

The other arrangement is the same as that of the embodiment shown in FIG. 8.

Figure 11:
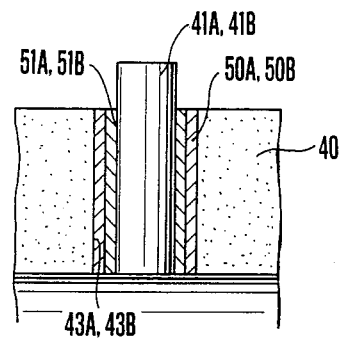
FIG. 11 is a sectional view of a main part of a measuring pipe showing still another embodiment of the present invention.

FIG. 11 shows still another embodiment in which an electrode 41A (41B) formed of platinum or a platinum alloy is inserted in an electrode insertion hole 43A (43B) by a brazing member 41A (41B). In this case, since the electrodes 41A and 41B are originally made of a conductive material, the metal layer 41b of the embodiment shown in FIG. 8 need not be formed. The other arrangement and a manufacturing method are the same as those of the embodiment shown in FIG. 8, and a detailed description thereof will be omitted.

Figure 12A:
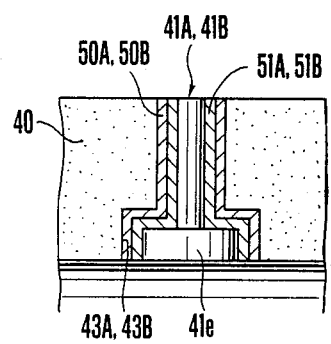
FIGS. 12a to 12d are sectional views showing still other embodiments of the electrode.
Figure 12B:
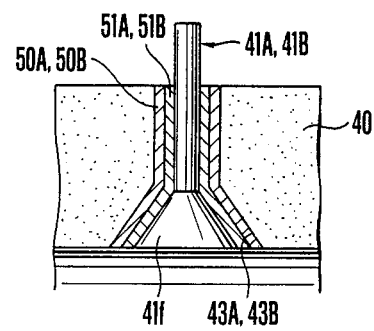
Figure 12C:
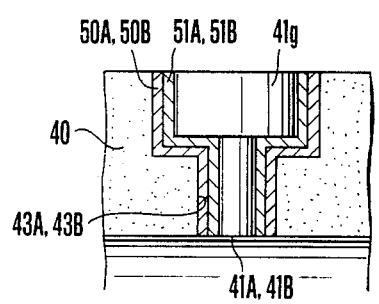
Figure 12D:
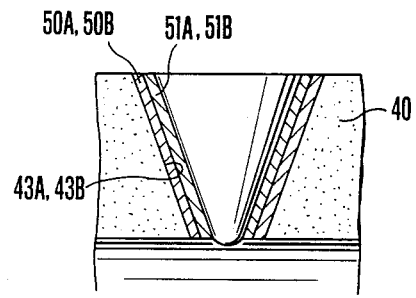

FIGS. 12a to 12d show modifications of electrodes 41A (41B) having different shapes and consisting of a conductive material. In FIGS. 12a and 12b, a disk portion 41e and a conical portion 41f are formed at the inner end portion of the electrode 41A (41B) to increase a liquid contact surface. In FIG. 12c, a large-diameter portion 41g is formed at the outer end portion of the electrode 41A (41B). In FIG. 12d, the electrode insertion hole 43A (43B) is a tapered hole narrowed toward the interior of the measuring pipe 40, and the electrode 41A (41B) is formed to be conical.

As described above, according to the method of manufacturing an electrode for an electromagnetic flowmeter of the present invention, the ceramic measuring pipe is sintered, and then the electrodes are inserted in the electrode insertion holes of the measuring pipe. Therefore, a degree of freedom of selection for the type of electrode material is increased. In addition, since the measuring pipe alone is sintered, a stress produced at the electrode mounting portions upon sintering and therefore a stress produced upon brazing of the electrodes can be reduced, thereby preventing cracks or damages of the measuring pipe. Also, even if dimensional variation occurs due to a lot difference or a manufacturing time difference, desired dimensional precision and surface roughness of the electrode insertion holes can be obtained because they can be subjected to a postprocessing, thereby improving the yield. Furthermore, since the electrodes are fixed by brazing, no high precision is required, and a reliable seal of the electrode insertion holes can be obtained by the brazing members. As a result, a high-performance electrode structure can be easily manufactured at low cost.

Figure 13:
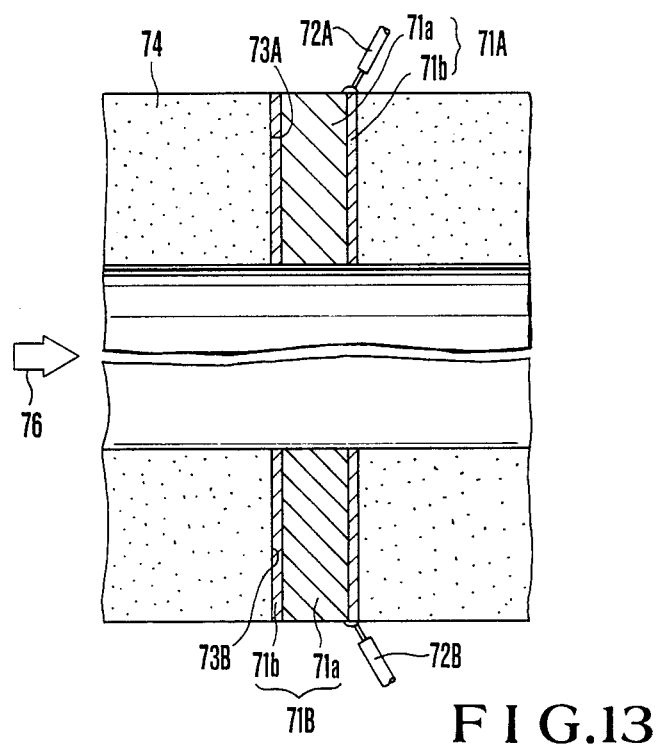
FIG. 13 is a sectional view of a main part of a measuring pipe showing still another embodiment of the present invention.

FIG. 13 shows still another embodiment of the present invention. Referring to FIG. 13, reference numeral 74 denotes a measuring pipe formed of a ceramic material such as $Al_2O_3$ or $ZrO_2$. A pair of excitation coils (see FIG. 1b) are arranged on the outer surface of the measuring pipe 74 to vertically sandwich the measuring pipe 74 and generates a magnetic field in a direction perpendicular to a flowing direction of a conductive fluid to be measured 76 flowing through the measuring pipe 74. A pair of electrode insertion holes 73A and 73B are formed in the central portions of the circumferential wall of the measuring pipe 74 to oppose each other in a direction perpendicular to both the flowing direction of the fluid to be measured 76 and a direction of the magnetic field generated by the excitation coils. Electrodes 71A and 71B are embedded in the electrode insertion holes 73A and 73B, respectively. Since the electrodes 71A and 71B have the same arrangement, only the electrode 71A will be described below.

The electrode 71A consists of a cylindrical metal layer 71b formed by metallizing (sintering) a paste as a conductive material on the inner surface of the electrode insertion hole 73A and a brazing member 71a filled inside the metal layer 71b. One end of a signal lead wire 72A is connected to the outer end of the metal layer 71b.

The conductive material for forming the metal layer 71b can be arbitrarily selected in accordance with the type of fluid to be measured. For example, if the electrodes 71A and 71B must have a corrosion resistance, a metal powder paste consisting of platinum, gold or the like is used. If the corrosion resistance is not required, an Mo-Mn-based paste, a W-based paste, an Ag-Pd-based paste, an Ag-Pt-based paste, an Ag paste or the like for electronic parts is used. The metal layer 71b is formed by coating a desired paste on the inner surface of the electrode insertion hole 73A (73B) and sintering the paste at a predetermined temperature for a predetermined time interval (at 1,000° to 1,200° C. for 10 to 30 minutes if the platinum paste is used). The sintering temperature of the measuring pipe 74 is about 1,800° C. in the case of $Al_2O_3$.

Examples of the brazing material 71a are conductive materials such as a silver brazing alloy, solder and gold silicon having lower melting points than that of the paste. Such a conductive material in a molten state is filled in the metal layer 71b nd cooled and solidified therein. In this case, brazing temperatures of the above conductive materials, i.e., a silver brazing alloy, solder and gold silicon are 500° to 600° C., about 200° C. and 300° to 400° C., respectively.

Figure 14:
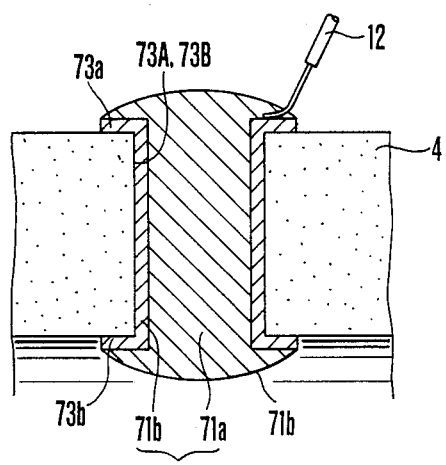
FIG. 14 is a sectional view of still another embodiment of the present invention.

FIG. 14 shows a modification of the electrode structure. Referring to FIG. 14, flange portions 73a and 73b are formed at both end opening portions of a cylindrical metal layer 71b and cover peripheries of both end opening portions of an electrode insertion hole 73A (73B). As a result, an area of an electrode inner end face 71d, i.e., a liquid contact area is increased so that the end face obtains a satisfactory strength against an internal pressure.

According to the electrode structure having the above arrangement, the paste is filled in the electrode insertion hole 73A (73B) of the sintered ceramic measuring pipe 74 and metallized to form the cylindrical metal layer 71b, and the brazing member 71a is filled therein to form the electrode 71A (71B). Therefore, the electrode insertion holes 73A and 73B can be subjected to machining like ordinary metal materials after the measuring pipe 74 is sintered, thereby obtaining dimensional precision and surface roughness similar to those obtained when ordinary metal materials are processed. As a result, a problem of variations in the measuring pipe 74 due to a lot difference or manufacturing time difference can be solved. In addition, since sintering of the metal layer 71b is performed in accordance with only the material of the paste to be used, the sintering temperature of the measuring pipe 74 need not be taken into consideration. Therefore, since a degree of freedom of selection for the electrode material is increased, less expensive materials can be used. Also, sintering of the metal layer 71b can be repeatedly performed for any number of times if necessary. Therefore, the electrode insertion holes 73A and 73B can be reliably sealed to prevent a leakage of the fluid to be measured 76 from between the inner surface of the insertion hole 73A (73B) and the metal layer 71b. Furthermore, since the electrodes 71A and 71B are formed in the sintered measuring pipe 74, a contraction amount of the measuring pipe 74 upon sintering of the paste is very small. Therefore, since only a small stress is produced due to contraction of the paste, cracks or damages of the measuring pipe 74 can be reduced or prevented. Moreover, in the conventional structure, the electrodes 71A and 71B sintered integrally with the measuring pipe 74 cannot be replaced even if they require replacement due to abrasion or the like. In the electrode structure of the present invention, however, the electrode 71A (71B) can be reproduced by heating and melting the metal layer 71b and the brazing member 71a, thereby effectively utilizing the measuring pipe 74.

The sectional shape of the electrode 71A (71B) is not limited to those shown in FIGS. 13 and 14 but may be modified as shown in FIGS. 15a to 15d. These modifications are identical to those shown in FIGS. 12a to 12d, and a detailed description thereof will be omitted.

As has been described above, according to the electrode structure for an electromagnetic flowmeter of the present invention, the paste is coated on the inner surface of the electrode insertion hole of the sintered ceramic measuring pipe and metallized to form the cylindrical metal layer, and the brazing member is filled and solidified therein to form the electrode. Therefore, fixing of the electrode and sealing of the electrode insertion hole can be reliably performed to prevent a leakage of the fluid to be measured and to increase a degree of freedom of selection for the electrode material. In addition, a stress produced at the electrode mounting portion of the measuring pipe upon metallizing of the metal layer can be reduced, thereby preventing cracks or damages of the measuring pipe. Also, since the electrode insertion hole can be subjected to machining, desired dimensional precision and surface roughness can be obtained, and the manufacturing yield of the measuring pipe can be improved. As a result, a high-performance electrode structure can be easily manufactured at low cost.

What is claimed is:

1. A method of manufacturing an electromagnetic flowmeter comprising the steps of:
    filling a pair of diametrically opposite insertion holes with a paste, said insertion holes traversing radially a circumferential wall of a measuring pipe made of a ceramic material, said measuring pipe being sintered and dimensionally stable prior to filling with said paste;
    heating and solidifying said paste to form electrode members, said electrode members being arranged from the outer surface of said measuring pipe to the inner surface thereof, said electrode members being integrated with said measuring pipe.

2. A method according to claim 1, wherein said paste comprises a metallic paste.

3. A method according to claim 1, wherein each of said electrode members has a conical inner end portion.

4. A method according to claim 1, wherein each of said electrode members has a disk-like inner end portion.

5. A method according to claim 1, wherein each of said electrode members comprises a rod member and a metal layer formed between the inner surface of a corresponding one of said insertion holes and said rod member.

6. A method according to claim 5, wherein said metal layer is formed by inserting the rod member in said corresponding one of said insertion holes after a metal paste is coated on the circumferential surface of said rod member.

7. A method according to claim 5, wherein a metal cap connected to said metal layer is mounted on the outer end of said rod member.

8. A method according to claim 5, wherein an outer end portion of said rod member has a large diameter.

9. A method according to claim 8, wherein a seat is formed in an outer opening end portion of each of said insertion holes, and the large-diameter portion of said rod member is fitted in said seat through said metal layer.

10. A method according to claim 5, wherein an inner end portion of said rod member has a large diameter.

11. A method according to claim 10, wherein a seat is formed in an inner opening end portion of each of said insertion holes, and the large-diameter portion of said rod member is fitted in said seat through said metal layer.

12. A method according to claim 5, wherein said metal layer is formed by inserting the rod member in said corresponding one of said insertion holes after a metal paste is coated on the circumferential surface and the inner end face of said rod member.

13. A method according to claim 5, wherein said rod member comprises a cylindrical member having a bottom and an open outer end.

14. A method according to claim 5, wherein an outer end portion of said corresponding one of said insertion holes is tapered and filled with a metal member after said rod member coated with said metal layer is inserted in said corresponding one of said insertion holes.

15. A method according to claim 5, wherein a large-diameter portion for positioning with respect to said corresponding one of said insertion holes is formed at the outer end of said rod member.

16. A method according to claim 5, wherein said corresponding one of said insertion holes is tapered, and the distal end of said rod member is conical.

17. A method according to claim 5, wherein said rod member comprises a ceramic material.

18. A method according to claim 5, wherein said rod member comprises a metal member.

19. A method according to claim 1, wherein each of said electrode members comprises a rod member and a metal layer formed between the inner surface of a corresponding one of said insertion holes and said rod member,
said corresponding one of said insertion holes is formed to be sufficiently larger than the outer diameter of said electrode member and
after said electrode member is inserted in said corresponding one of said insertion holes, a brazing member having a melting point lower than that of said metal layer is filled therein.

20. A method according to claim 19, wherein after a second metal layer is formed on the inner surface of said corresponding one of said insertion holes, said electrode member is inserted therein.

21. A method according to claim 19, wherein after a metal paste in coated on the circumferential surface of said rod member, said metal layer is formed by inserting the rod member in said corresponding one of said insertion holes.

22. A method according to claim 19, wherein a metal cap connected to said metal layer is mounted on the outer end of said rod member after said metal layer is inserted in said corresponding one of said insertion holes.

23. A method according to claim 19, wherein after a metal paste is coated on the circumferential surface and the inner end face of said rod member, said metal layer is formed by inserting the rod member in said corresponding one of said insertion holes.

24. A method according to claim 23, wherein a metal cap is mounted on the inner end face of said rod member through said metal paste.

25. A method according to claim 19, wherein said corresponding one of said insertion holes is tapered, and the distal end of said rod member is conical.

26. A method according to claim 1, wherein each of said electrode members comprises a rod member,
each of said insertion holes is formed to be sufficiently larger than the size of said electrode member and
after said rod member is inserted in at least one of said insertion holes, a brazing member having a low melting point is filled therein.

27. A method according to claim 26, wherein a seat is formed in an outer opening end portion of said at least one insertion hole, and a large-diameter portion of said rod member is fitted in said seat through said metal layer.

28. A method according to claim 26, wherein a seat is formed in an inner opening end portion of said at least one insertion hole, and a large-diameter portion of said rod member is fitted in said seat through said metal layer.

29. A method according to claim 26, wherein said at least one insertion hole is tapered, and the distal end of said rod member is conical.

30. A method according to claim 1, wherein each of said electrode members comprises a metal member and a brazing member having a lower melting point than that of said metal member, and
after a layer of said metal member is formed on the inner surface of each of said insertion holes, said brazing member having the lower melting point than that of said metal layer is filled therein.

31. A method according to claim 30, wherein said metal layer consists of a metal paste.

32. A method according to claim 30, wherein said metal layer has a flange at an inner periphery of at least one of said insertion holes.

33. A method according to claim 30, wherein at least one of said insertion holes is tapered at an inner end portion thereof.

34. A method according to claim 30, wherein a seat is formed in an inner opening end portion of said at least one insertion hole.

35. A method according to claim 30, wherein a seat is formed in an outer end portion of said at least one insertion hole.

36. A method according to claim 30, wherein said at least one insertion hole is tapered from outside to inside.

37. A method of manufacturing an electromagnetic flowmeter, comprising the steps of:
filling a pair of diametrically opposite insertion holes with a paste, said insertion holes traversing radially a circumferential wall of a measuring pipe made of a ceramic material, said measuring pipe being sintered and dimensionally stable prior to filling with said paste;

heating and solidifying said paste to form electrode members, said electrode members being arranged from the outer surface of said measuring pipe to the inner surface thereof, said electrode members being integrated with said measuring pipe;

wherein each of said electrode members includes at least a metallized layer.

* * * * *